(12) United States Patent
Bosanac

(10) Patent No.: US 12,444,046 B2
(45) Date of Patent: Oct. 14, 2025

(54) PREDICTING HEALTH OR DISEASE FROM USER CAPTURED IMAGES OR VIDEOS

(71) Applicant: Advanced Health Intelligence Ltd., South Perth (AU)

(72) Inventor: Vlado Bosanac, South Perth (AU)

(73) Assignee: Advanced Health Intelligence Ltd., South Perth (AU)

(*) Notice: Subject to any disclaimer, the term of this patent is extended or adjusted under 35 U.S.C. 154(b) by 564 days.

(21) Appl. No.: 17/900,537

(22) Filed: Aug. 31, 2022

(65) Prior Publication Data

US 2023/0066883 A1  Mar. 2, 2023

Related U.S. Application Data

(60) Provisional application No. 63/239,302, filed on Aug. 31, 2021.

(51) Int. Cl.
*G06T 7/00* (2017.01)
*A61B 5/00* (2006.01)
(Continued)

(52) U.S. Cl.
CPC .......... *G06T 7/0012* (2013.01); *A61B 5/0079* (2013.01); *A61B 5/1079* (2013.01); (Continued)

(58) Field of Classification Search
CPC ..... A61B 5/486; A61B 5/7267; A61B 5/7275; A61B 5/7445; A61B 5/1032; A61B 5/1118; A61B 5/112; A61B 5/1123; A61B 5/743; A61B 5/1128; G06V 10/70; G06V 40/10; G06T 2207/10016; G06T 2207/20081; G06T 2207/30004; G06T 2207/30196; G06T 2207/20084; G06T 7/001;
(Continued)

(56) References Cited

U.S. PATENT DOCUMENTS 9,949,697 B2    4/2018  Iscoe et al.
10,825,564 B1  11/2020  Zhang et al.
(Continued)

FOREIGN PATENT DOCUMENTS

JP     2008242963 A    10/2008
JP     2016045531 A     4/2016
(Continued)

OTHER PUBLICATIONS

International Search Report and Written Opinion for PCT Application No. PCT/IB2022/000496 dated Jan. 5, 2023.
(Continued)

*Primary Examiner* — Cindy Trandai
(74) *Attorney, Agent, or Firm* — Dorsey & Whitney LLP

(57) ABSTRACT

A method can include capturing an image, images, or a video of a user with the image, images or video capturing system of an exercise device and detecting a health or disease indicator from the images or video. An apparatus includes a camera, a processor, and computer readable medium containing programming instructions that, when executed, will cause the processor to use a machine learning model and one or more images or videos of a subject captured by the camera to detect a health or disease indicator.

20 Claims, 5 Drawing Sheets

(51) Int. Cl.
*A61B 5/107* (2006.01)
*G06V 10/70* (2022.01)

(52) U.S. Cl.
CPC ............ *A61B 5/486* (2013.01); *A61B 5/7267* (2013.01); *A61B 5/7275* (2013.01); *A61B 5/7445* (2013.01); *G06V 10/70* (2022.01); *G06T 2207/10016* (2013.01); *G06T 2207/20081* (2013.01); *G06T 2207/30004* (2013.01); *G06T 2207/30196* (2013.01)

(58) Field of Classification Search
CPC ........ G16H 50/20; G16H 30/00; G16H 50/30; A63B 24/0075; A63B 2220/05; A63B 2220/806; G16B 40/00
See application file for complete search history.

(56) References Cited

U.S. PATENT DOCUMENTS

| | | | | |
|---|---|---|---|---|
| 11,978,558 | B1* | 5/2024 | Drakos | G16H 50/70 |
| 12,257,028 | B2* | 3/2025 | Valsan | A61B 5/7278 |
| 2016/0055758 | A1* | 2/2016 | Francis | G09B 7/00 434/236 |
| 2017/0079530 | A1* | 3/2017 | DiMaio | A61B 5/0261 |
| 2018/0289334 | A1 | 10/2018 | De Brouwer et al. | |
| 2020/0129237 | A1* | 4/2020 | Ay | A61B 34/10 |
| 2020/0194115 | A1* | 6/2020 | Chou | A61B 5/0077 |
| 2021/0008413 | A1* | 1/2021 | Asikainen | G06F 3/0304 |
| 2021/0038088 | A1 | 2/2021 | Atallah et al. | |
| 2021/0057105 | A1 | 2/2021 | Hanina et al. | |
| 2021/0128059 | A1 | 5/2021 | Hanina et al. | |
| 2021/0315486 | A1* | 10/2021 | Delp | G16H 50/50 |
| 2021/0346761 | A1* | 11/2021 | Sterling | G06N 20/00 |
| 2021/0358613 | A1* | 11/2021 | Kaleal, III | G06F 1/1626 |
| 2022/0301723 | A1* | 9/2022 | Bosanac | G16H 50/20 |
| 2022/0338757 | A1* | 10/2022 | Kim | A61B 5/7264 |
| 2022/0400989 | A1* | 12/2022 | Myers | A61B 5/14551 |
| 2023/0065288 | A1* | 3/2023 | Valsan | G16H 50/20 |
| 2023/0215153 | A1* | 7/2023 | Kasischke | G06T 19/20 382/131 |
| 2024/0138780 | A1* | 5/2024 | Pesala | G16H 50/20 |

FOREIGN PATENT DOCUMENTS

| | | |
|---|---|---|
| JP | 2017217472 A | 12/2017 |
| JP | 2018042811 A | 3/2018 |
| JP | 2021096536 A | 6/2021 |
| WO | 2020132713 A1 | 7/2020 |

OTHER PUBLICATIONS

Viejo, et al., "Non-Contact Heart Rate and Blood Pressure Estimations from Video Analysis and Machine Learning Modelling Applied to Food Sensory Responses: A Case Study for Chocolate", Sensors 2018, 18(6), 1802; [Retrieved from the Internet on Jan. 3, 2023] <URL: https://doi.org/10.3390/s18061802>.
EP22863707.0 Extended European Search Report dated Jun. 4, 2025.

* cited by examiner

PREDICTING HEALTH OR DISEASE FROM USER CAPTURED IMAGES OR VIDEOS

CROSS-REFERENCE TO RELATED APPLICATIONS

This application claims the benefit of priority to U.S. Provisional Patent Application No. 63/239,302, filed 31 Aug. 2021, and entitled "PREDICTING HEALTH OR DISEASE FROM USER CAPTURED IMAGES OR VIDEO," the disclosure of which is incorporated herewith in its entirety and for all purposes.

FIELD

The described embodiments relate generally to machine learning systems, and specifically relate to increasing the accuracy of machine learning systems by combining multiple predictive techniques including the capture of vital signs and individual health data via a device to predict personal health risks and recommendations.

BACKGROUND

Despite advancements in health care and modern medicine, accurate prediction and detection of health conditions and/or diseases, such as stroke, cardiovascular health or disease, obesity, and type-2 diabetes, continue to be a challenge. Millions of lives can be saved, and quality of life improved, through early detection and prevention. However, the prediction and detection of these conditions and diseases still suffer due to the need for traditionally expensive and inaccessible medical equipment, such as large and expensive scanners and blood pressure monitors, and the inaccuracy of many traditional techniques.

In addition, many people are not aware of the early signs of many health conditions, health markers, and disease indicators for which they should be getting regularly checked by a physician. Even then, traditional techniques, such as biometric tests and other data including body mass index (BMI) calculations, can be inaccurate. Even traditional machine learning systems can be limited based on inherent design inaccuracies, statistical outliers, and/or relatively small data-sets and experience. Therefore, it may be desirable to assess a person's health conditions including potential indicators of chronic disease risks via inexpensive, safe, and accurate methods.

SUMMARY

One aspect of the present disclosure relates to a method of predicting health markers and/or chronic disease markers. The method can include capturing an image or a video of a user with an image or video capturing system embedded into a commonly encountered appliance, device, vehicle, or system, such as an exercise device, an automobile, or a home appliance and detecting a health or disease indicators from the image or video. According to one embodiment, the device including the image or video capturing system can include a dual use electronic device that typically serves a dedicated purpose, such as an appliance or device use, but also serves to monitor users and to capture images of the user for further analysis and health and disease prediction.

In one example, a machine learning network is used to detect the health or disease indicator. In one example, the image or video capturing system includes a camera configured to capture the image or video of the user while the user is exercising, driving, or otherwise carrying out an activity with or near the device including the image or video capturing system. In one example, capturing the image or video includes capturing multiple images or videos in a consolidated video format. In one example, the device including the image or video capturing system includes a display system having a display screen. In one example, the image or video capturing device includes a web-cam or another camera that is communicatively connected to the Internet or another network. Alternatively, the image or video capturing device can include memory and a processor configured to store the image or video until such time as the image or video capturing device is connected to the Internet, the cloud, or another desirable network. In one example, the device includes a reflective portion that displays a reflected image's or video of the user. In one example, the health or disease indicator includes a heart health or disease indicator. In one example, the health or disease indicator includes a stroke indicator. In one example, the health or disease indicator incudes an orthopedic abnormality indicator.

One aspect of the present disclosure relates to an apparatus that includes a camera, a processor, and computer readable medium containing programming instructions that, when executed, will cause the processor to use a machine learning model and one or more images or videos of a subject captured by the camera to detect a health or disease indicator.

In one example, the programming instructions, when executed, will further cause the processor to predict a health or disease based on the detected health or disease indicator. In one example, the apparatus also includes a display portion. In one example, the display portion includes a reflective portion. In one example, the apparatus includes an exercise or personal health feature. In one example, the health or disease indicator includes a stroke indicator or a heart health or disease indicator.

One aspect of the present disclosure relates to a method of detecting health or disease indicators the method can include providing a device, capturing an image or video of a user with an image or video capturing system of the device, and executing programming instructions contained on computer readable medium to cause the processor to detect a health or disease indicator from the images or video. The device can include the images or video capturing system and the processor.

In one example, capturing the images or video includes capturing multiple images or videos in a consolidated video format. In one example, the device further includes a display portion. In one example, the device is an exercise device.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
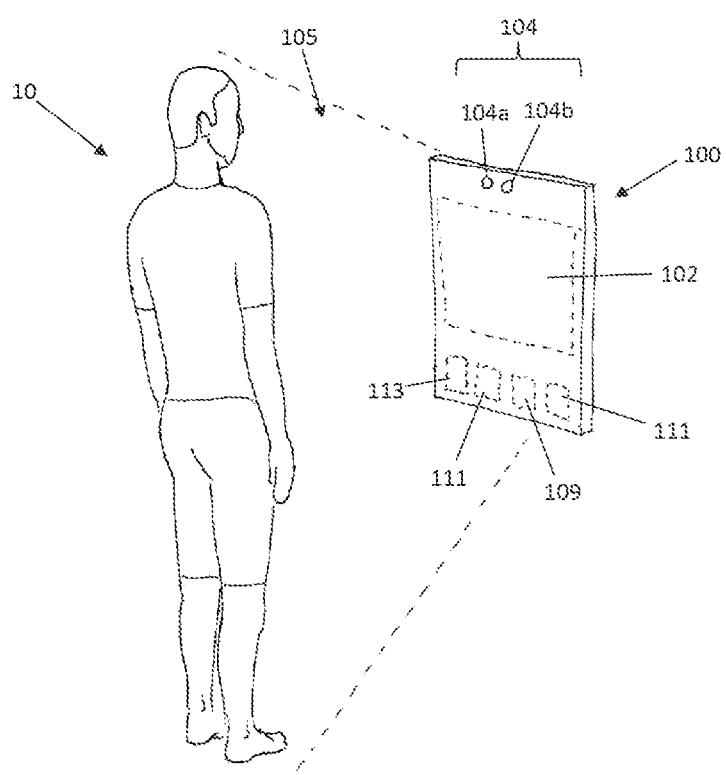
FIG. 1 shows an example of a device and a user according to some examples described in the disclosure.

Certain details are set forth below to provide a sufficient understanding of examples of various embodiments of the disclosure. However, it is appreciated that examples described herein may be practiced without these particular details. Moreover, the particular examples of the present disclosure described herein should not be construed to limit the scope of the disclosure to these particular examples. In other instances, well-known circuits, control signals, timing protocols, and software operations have not been shown in detail in order to avoid unnecessarily obscuring embodiments of the disclosure. Additionally, terms such as "couples" and "coupled" mean that two components may be directly or indirectly electrically coupled. Indirectly coupled may imply that two components are coupled through one or more intermediate components.

Aspects of the present disclosure provide an easy, quick, safe, inexpensive, and completely non-invasive determination of a person's health or disease risk. Rather than pay for expensive doctor's visits for evaluation of individual health or disease risks, users of devices and systems described herein can simply capture images or videos of themselves, either while still, while driving, while exercising, or while otherwise interacting with standard electronic devices, and the health or risks of various diseases can be evaluated and relayed to the user as applicable.

In one example, a method of predicting health or disease can include capturing an image, a video, or a series of images or videos of the user and detecting one or more health or disease indicators from the one or more images or videos. In one example, the images or video can be captured while the user is interacting with an electronic device, and can be captured while the user is moving. In one example, the image or video capture device includes a camera and a display portion as part of a home appliance, a standard electronic device, an automobile, or an exercise device. In another example, a device of the present disclosure includes a camera, a processor, and computer readable medium containing programming instructions that, when executed, will cause the processor to use a machine learning model and one or more images or videos of a subject captured by the camera to detect health or disease indicators.

When the user is moving or exercising, certain physiological processes may be altered, for example blood flow and heart rate, such that certain health or disease indicators may manifest more clearly during exercise. In one example, systems described herein can detect, for example, changes in complexion at certain regions of a person's skin that indicate changes in blood flow and heart rates. During exercise, heart rate generally increases and so may blood flow. Thus, during exercise or other movements of the user, certain physiological processes can be measured or detected and related to health or disease indicators. Analysis using artificial intelligence algorithms that draw from training data sets of a population of users can then determine whether the detected physiological abnormalities or other biometric data collected are indicative of health or disease or other chronic conditions such as heart health or disease, diabetes, stroke, or other health or diseases and conditions or vital signs. In some examples, any portion of the body or user can be used to determine or predict health or disease, such as the entire body, face, skin, blood, musculoskeletal models, and the like.

In one example, systems described herein can be used to identify and analyze the movements of a person, through captured video, including a person's gait. Some health conditions can affect a person's gait, for example a stroke that affects the movement of one side of the person. Such movements can be analyzed using artificial intelligence algorithms trained by training data sets to detect and predict such conditions.

Another predictive indicator that can be captured and analyzed by devices and systems described herein include the standing and moving posture of the user. During exercise or movement of a person, an image or video capture device can capture the posture of the person and machine learning algorithms can be used to determine if such postures are indicative of certain orthopedic abnormalities or other conditions that can lead to chronic pain, for example back issues or hip and knee problems.

Examples of devices and systems described herein, which are a part of exercise or other physical training devices, home appliances or electronic devices, or automobiles, can be advantageous in detecting and predicting health or diseases from visual health or disease indicators. Persons using exercise devices are motivate to move for the sake of exercise, perhaps as part of a normal exercise routine. As such, the systems and devices described herein can detect, predict, and even diagnose the person during his or her exercise routine without the need to separately consult a physician or other medical specialist. Rather, without thinking or worrying about any potential health or diseases or chronic conditions, the person can simply carry out his or her regular exercise routine and be analyzed without hassle. Similarly, common household appliances, electronic devices, and/or automobiles can use image or video capture systems to monitor a user and the user's vital signs, to be provided to a machine learning model, to predict potential health or disease conditions.

In addition, in some examples of the present disclosure, systems and devices that are a part of an exercise device, for example an exercise bike with a display screen for communicating exercise routine instructions and so forth, can be utilized to instruct the user to move or exercise in a certain way that enhances certain health or disease indicators, if present. For example, some health or disease indicators that arise from analyzing blood flow via images or videos of the user's skin may only arise, or may at least be more readily apparent, after a certain heart rate is reached by the user for a certain duration. In such a case, using systems and devices of the present disclosure, the display portion of the device or exercise device can instruct the user to perform a certain movement or exercise routine that increases the user's heart rate or conditions to the level for detection of the targeted health or disease indicator. Similarly, common or traditional interaction with common household appliances, tools, or automobiles (such as those that induce stress, calm, elevated or lowered heart rate, and the like) can often provide environments where observation of a user's vital signs may be enhanced for detecting health or disease indicators.

Additionally, the systems for capturing, determining, and analyzing health or disease risks, including machine learning systems, can receive and incorporate additional information from common objects, such as from a pulse rate or breathing rate detection using a back camera of a personal communication device, or similar vital sign collection system. This additional information can be used to supplement and enhance the accuracy of the observed and captured image-based detection performed by the machine learning models and systems. Any combination of body dimensions, body compositions, vital sign collection and/or estimation can then be utilized as inputs to the machine learning models and systems to predict potential health or disease conditions. In some instances recommendations, such as exercise, sleep, food, posture, and/or medications can be provided in response to certain health or disease conditions estimated by the present systems.

The details of these apparatus, methods, and systems, as well as their advantages, are disclosed in more detail below. For example, FIG. 1 shows a device or system 100 that includes an image or video capturing system 104 and a display system 102. The image or video capturing system 104 can include one or more cameras 104a or other sensor 104b configured to view the user 10 within the field of view 105 of the image or video capturing system 104. In the illustrated example, the image or video capture system 104 includes a camera 104a and another sensor 104b. However, this example is not meant as limiting and other examples can include image or video capture systems that have more or less than the number and arrangement of cameras and sensors shown in FIG. 1. In any case, the image or video capture system 104 can be configured to capture one or more images or videos of the user 10, including a series of images or videos in video format. When referring to an image or video or images or videos captured by systems and devices described herein, the term "images or video" and "images or videos" are meant to include videos and video recordings, which constitute a series of images or videos captured or recorded by the image or video capturing system 104.

In at least one example, the cameras 104a and sensors 104b of the image or video capturing system 104 can be linked with other components of the system 100 that transmit captured image or videos and videos to one or more other devices and systems, for example internet servers or other remote systems and devices. In such examples, the image or video capturing systems can include web-cams connected to computing devices or other transmitting devices for transmitting the captured video or images or videos over the internet or other networks. In some examples, the image or video capturing systems can store and/or process the captured images or videos locally, and then transmit the captured images or videos when access to the internet or other networks become available.

In at least one example, the image or video capturing system 104 is configured to visualize and capture images or videos of the user 10 when the user is within the field of view 105 thereof. The images or video capturing system 104 can do so while the user 10 is still or while the user 10 is moving, for example during an exercise routine. Certain health or disease indicators, which are described herein, including but not limited to skin complexion due to variations in blood flow, and so forth, can be imaged or videoed and captured by the image or video capturing system 104 while the user is either moving or stationary. For ease of explanation, the present exemplary system and method will be described herein within the context of the image or video capturing system 104 being included in an exercise system, but the same systems and methods can be incorporated into any number of systems for capturing images and videos for analysis and possible detection of health or disease indicators using a machine learning model, including, but in no way limited to home appliances, common home components such as bathroom mirrors, home entertainment systems and other electronic devices, automobile or transportation systems, and the like.

In one example, the system 100 of FIG. 1 can also include a display system 102. The display system 102 can include a display screen or other visual display component that communicates information to the user. The display system 102 can also include one or more speakers for delivering audio content to the user 10. In one example, the display system 102 can include the display screen of an exercise device, such as the display screen of a treadmill or exercise bike, where the user 10 receives instructions from a live-feed instructor or pre-recorded instructor. In some examples, the exercise device of which the display system 102 may be a part can communicate written or other visual or audio instructions to the user 10, or an electronic device associated with the user, as part of an exercise routine. Similarly, when the display system 102 is integrated into a common household item, such as an appliance or bathroom mirror, the household item may include a transmitter capable of communicating with a personal electronic associated with the user.

The image's or video capturing system 104 can capture images or videos, including images or videos of certain health or disease indicators discussed herein, while the display system 102 instructs the user 10 to move or exercise in a certain way. Such movements and exercise can be tailored specifically to increase the likelihood of certain target health or disease indicators manifesting. Alternatively, or additionally, the user can self-select any number of exercise routines or instructions output by the display system 102, including online work-out videos and instructors or joining a network of other people participating in a live-streamed exercise class. In any case, while the user is exercising or otherwise moving within the field of view 105 of the image or video capturing system 104, the image or video capturing system 104 can capture and record images or videos for transmission to other systems for analyzing whether or not certain health or disease indicators are manifested by the user 10.

Along these lines, one example of the system 100 shown in FIG. 1 can include additional components electrically connected to the image or video capturing system 104 and/or the display system 102. For example, the system 100 can also include one or more processors 107, one or more memory components 109, one or more antennas or other transmitter/receiver components 111, and one or more other components 113 or electrical circuitry, including circuit boards and the like, that enable the system 100 to perform functions described herein.

In at least one example, the system 100 shown in FIG. 1 can be a part of an exercise device, including but not limited to a treadmill, an exercise bike, a weight lifting machine, or any other exercise or personal device, such that at least a portion of the user 10 is within the field of view 105 and interacting with the system 100 during movement and exercise. In one example, the system 100 can be integrated into the control panel or dashboard of a treadmill or exercise bike. In another example, the system 100 can include one or more weight lifting features attached thereto, for example one or more weighted cables, pulley systems, resistance arms, pull-up bars, or other exercise features or devices and machines commonly found in gyms or homes.

As noted previously, when integrated into a home appliances, common home components such as bathroom mirrors, home entertainment systems and other electronic devices, automobile or transportation systems, and the like, the system 100 can be integrated into any display or control panel of the home appliance, feature, entertainment system, personal electronic device, or automobile.

Figure 2:
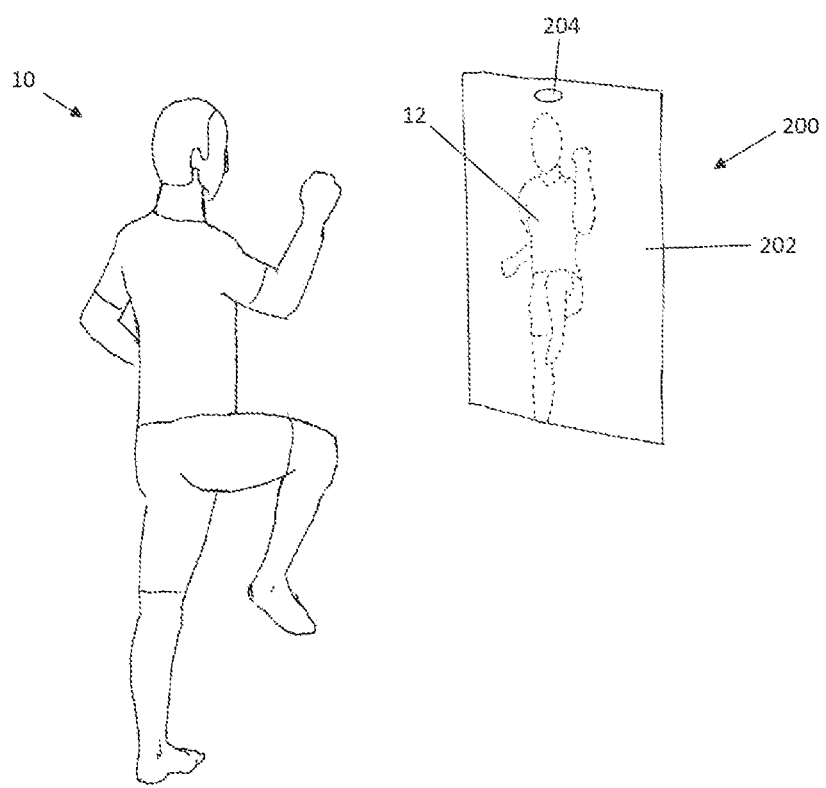
FIG. 2 shows an example of a user interacting with an exercise device according to some examples described in the disclosure.

In one example, as shown in FIG. 2, a system or device 200 can include an exercise device, such as an exercise display device having a display screen 202. In some example, exercise display screens can overlay a mirror or partially reflective portion that reflects an image or video 12 of the user during exercise. Such devices 200 can be referred to as exercise mirrors or fitness mirrors. In some examples, the image or video 12 of the user 10 reflected in the device can be overlaid or combined with other visual displays projected from the display screen 202. Overlaid images or videos including fitness instructors, videos, visual exercise instructions, and the like, can be produced from such devices 200. In addition, one example of the device 200 can include an image or video capture system 204 similar to that described with reference to the system 100 of FIG. 1.

The device 200 can also include any feature or component, alone or in any combination, described with reference to system 100 of FIG. 1, including processors, antennas, memory components, speakers, display components, or any other component generally known in the art and necessary for the functions of device 200 described herein.

Using the device 200 shown in FIG. 2, the user can analyze his or her own movement through the reflected image or video 12 to ensure that exercise routines and instructions are followed properly. This can be advantageous to direct the user in properly performing certain movements and exercises that can be communicated through the device 200, which enhance or cause the manifestation of certain health or disease indicators of interest, as described herein.

Some indicators such as blood flow, can be extracted from one or more camera images or videos based on image or video processing at micro-pixel level. Similar to the examples shown in FIGS. 1 and 2, the image or video capture system 304 can be configured to capture the face images or videos of a user, and detect the blood flow from the captured face images or videos. In some examples, the user interaction and display system 302 can be configured to guide the user during the capturing/detecting of the blood flow, similar to what was described in the examples of FIGS. 1 and 2. In some examples, the blood flow, and/or other physiological features and health or disease indicators can be detected from facial images or videos, partial facial images or videos, or images or videos of other parts of the human body. The extracted physiological indicators and features can be provided to the health or disease risk model 310 to generate heart health or disease related indicators, as similarly described in examples shown in FIGS. 1 and 2.

Additional information can be provide to the health or disease risk model 310, in any number of combinations, such as from a pulse rate or breathing rate detection using a back camera of a personal communication device, or similar vital sign collection system. This additional information can be used to supplement and enhance the accuracy of the observed and captured image-based detection and can improve the accuracy of the health or disease risk model 310. Any combination of body dimensions, body compositions, vital sign collection and/or estimation can be utilized as inputs to the health or disease risk model 310 to predict potential health or disease conditions. In some instances recommendations, such as exercise, sleep, food, posture, and/or medications can be provided in response to certain health or disease conditions estimated by the present systems.

Figure 3:
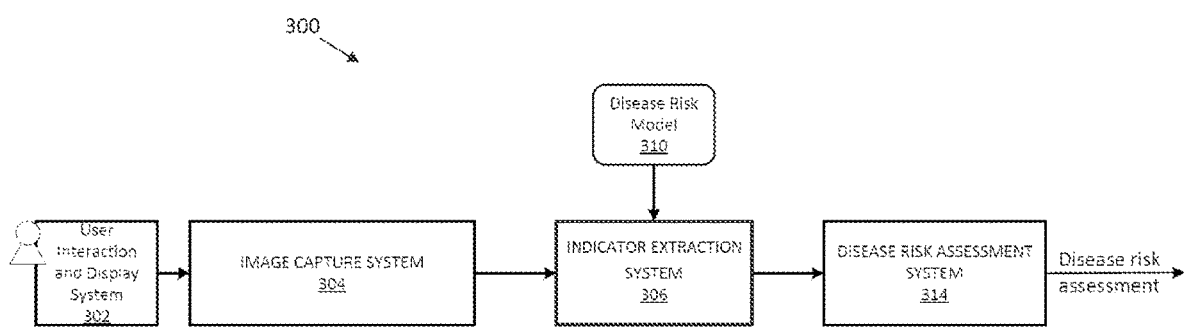
FIG. 3 is a block diagram of a system for assessing a person's health or disease risks according to some examples described in the disclosure.

FIG. 3 is a block diagram of a system for assessing a person's health or disease risks using data and images/videos gathered and transmitted by devices described herein. As described herein, assessing health or disease risk can include detecting health or disease indicators and predicting health or disease based on early health or disease indicators or risk factors. A health or disease risk assessment system 300 can include one or more components similar to those in the system 100 and 200 of FIGS. 1 and 2, respectively. For example, the user interaction and display system 302 and image or video capture system 304 can be similar to the user interaction and display system 102 and image or video capture system 104, the description of which will not be repeated. In some examples, the system 300 can include an indicator extraction system 306 configured to extract biometric data and health or disease indicators from the captured images or videos from the image or video capture system 304. Examples of the health or disease indicators can include blood flow, 3D body shape and body shape indicators, body dimensions (either detected virtually or physically), movement and gait analysis, vital signs such as heart rate, body temperature, blood pressure, and respiration or breathing rate, and other indicators previously described with reference to the example of FIG. 1. The health or disease indicators can also include heart health or disease related biomarkers. In at least one example, a single health or disease risk model 310 can be used to assess multiple health or disease indicators either individually or in combination.

The health or disease risk model 310 can be trained from user images or videos by a machine learning network. For example, the health or disease risk model can be trained by a health or disease risk model training system and its associated data set. In some examples, the health or disease risk model can include weights and/or parameters representing the relationships between user images or videos (and/or user data) and various health or disease indicators. These indicators/parameters are learned from a collection of training data sets. The training of the health or disease risk model will be further described in detail with reference to FIG. 4.

Additionally, and/or alternatively, the indicator extraction system 306 can also extract physiological features and health or disease indicators directly from the user captured images or videos, including a series of images or videos, as noted above. For example, some indicators such as blood flow, can be extracted from one or more camera images or videos based on image or video processing at micro-pixel level. Similar to the embodiments in FIG. 1, the image or video capture system 304 can be configured to capture the face image or videos of a user, and detect the blood flow from the captured face image or videos. In some examples, the user interaction and display system 302 can be configured to guide the user during the capturing/detecting of the blood flow, similar to what was described in the example of FIG. 1. In some examples, the blood flow, and/or other physiological features and health or disease indicators can be detected from facial images or videos, partial facial images or videos, or images or videos of other parts of the human body. The extracted physiological features and health or disease indicators can be provided to the health or disease risk model 310 to generate heart health or disease related indicators, as similarly described in embodiments in FIG. 1. The indicator extraction system 306 can also collect sensed or detected information about the user, such as actual pulse or respiration rates, body dimensions and compositions, and can use any combination thereof to help supplement the previously discussed indicators.

In some examples, the system 300 can include a health or disease risk assessment system 314 configured to receive the indicators from the indicator extraction system 306, such as the 3D body shape, body shape indicators, body dimensions (either detected virtually or physically), movement and gait analysis, vital signs such as heart rate, body temperature, blood pressure, and respiration or breathing rate, body composition indicators, and other disease related biomarkers. The health or disease risk assessment system 314 can use the extracted health or disease indicators to generate one or more health or disease risk values. For example, the health or disease risk values can include multiple values representing the risk of diabetes, such as Type-2 diabetes risk, obesity risk, central obesity risk, cardiovascular disease risk, heart attack risk, and stroke risk. In some examples, the risk values can then be used to provide a recommended course of action, such as diet changes, recommended exercises, modified sleeping habits, possible medication treatments, and the like.

Figure 4:
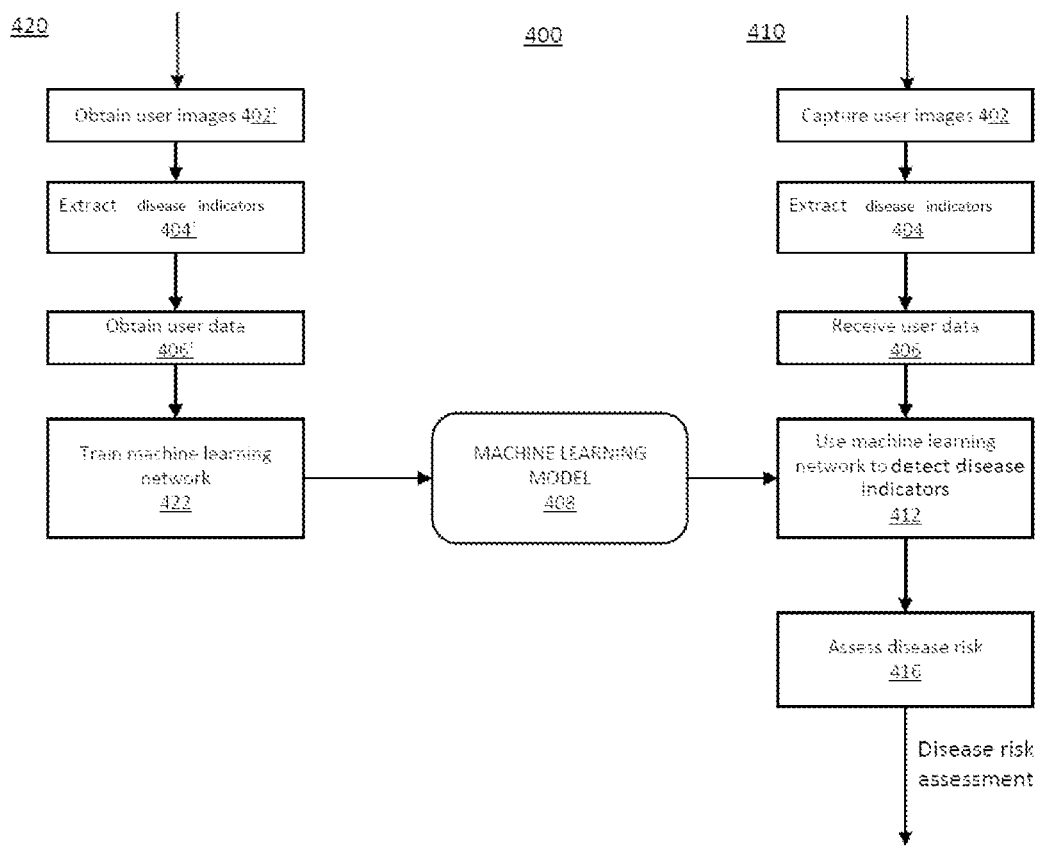
FIG. 4 is an example process for assessing a person's health or disease risks using a machine learning network according to some examples described in the disclosure.

FIG. 4 is an example process for assessing a person's health or disease risks using a machine learning network according to some examples described in the disclosure. In some examples, the example process 400 can be implemented in health or disease risk assessment system 300 in FIG. 3. With reference to FIG. 4, the process 400 can include a prediction process 410. The prediction process 410 can include capturing user images or videos at operation 402, extracting health or disease indicators at operation 404, and/or receiving user data at 406. The operation 402 can be performed in the image or video capture system 104 shown in FIG. 1 to obtain one or more user images or videos, such as still images or videos including multiple images or videos of the user moving during exercise or while interacting with an appliance or other item. The user images or videos can be facial images or videos, upper body images or videos, and/or whole body images or videos. Once captured, the prediction process 410 can use the images and/or videos to detect actual indicators and/or to determine user body dimensions, body compositions, and vital sign values (such as pulse rate, or breathing rate). Additionally, user data can be received 406. The user data can include quantifiable values that can be ascertained and provided by the user, such as a user age, weight, nationality, sex, and/or test gatherable information such as detected pulse rate, respiration rate, blood pressure, body temperature, and the like. Any combinations of these factors can then be used and provided to the system as user data.

The process 400 can further include a training process 420 for training the machine learning model 408. In some examples, the process 420 can include obtaining the user images or videos at operation 402', extracting health or disease indicators at operation 404', and obtaining user data at operation 406'. The process 420 can use the images or videos/indicators/data from the operations 402', 404', and/or 406', to train the machine learning model at operation 422. The processes 402', 404', and 406' can be performed in the same manner as processes 402, 404 and 406, respectively, except that the user images or videos obtained from operation 402' are different from the user images or videos captured from operation 402, and that the user data obtained from 406' are different from those obtained from 406.

In non-limiting examples, the operation 402' can retrieve user images or videos from a training data set. For example, the training data set can contain a collection of training user images or videos and/or training user data previously captured or collected, along with ground truth data associated with the training data set. The ground truth data can contain the ground truth health or disease indicators or other biometric features and data.

In some examples, the training data can include multiple sets each collected from a subject in a group of subjects, and each set containing a corresponding ground truth data. In some examples, the operation 422 can train the machine learning network to generate a machine learning model 408 based on the collected training data. In some examples, the training process 422 can generate a single machine learning model 408 based on the collected training data from the group of subjects. The collected data can be used to modify the weights and parameters for the machine learning model.

In some other examples, the training process 422 can generate multiple machine learning models 408, each based on the training data from a sub-group of subjects or a single subject. For example, the training process can generate a machine learning model for a sub-group of the training subjects divided by ethnic group, by gender, by age, by height, or by other demographical measures, such as profession, education etc. The machine learning model 408 can thus include one or more models having a set of typical body features. The machine learning model 408 can thus include one or more health or disease risk models (e.g., 310 in FIG. 3). Returning to process 410, the operation of assessing the health or disease risk can be performed using the machine learning model 408 learned from the process 420.

The process 410 can further include using a machine learning model 408 to predict health or disease indicators at 412, based on any combination of the extracted indicators from operations 404, 406. In some examples, operation 412 can be implemented in the indicator extraction system 306 of FIG. 3. As discussed with respect to the example shown in FIG. 3, the predicted health or disease indicators can include both 2D and/or 3D body shape, body dimension, and body shape, body composition features (e.g., body volume, body fat, bone mineral density or other indicators), vital signs such as body temperature, blood pressure, pulse or heart rate, breathing rate, stroke indicators, heart health or disease indicators, and any other health or disease indicators or other biometric data and biomarkers discussed herein. Thus, the machine learning model 408 can include the relationship between the training user images or videos/user data and the various health or disease indicators.

In some other examples, the training process 422 can generate multiple machine learning models 408, each based on the training data from a sub-group of subjects or a single subject. For example, the training process can generate a machine learning model for a sub-group of the graining subjects divided by ethnical group, by gender, by age, by height, or by other demographical measures, such as profession, education etc.

Returning to systems 100 and 300 in FIGS. 1 and 3, respectively, the systems can include a training system to train and optimize one or more machine learning models based on training data. The training data can be obtained from user image or video database, body scan database, and/or medical image or video database. In some examples, the systems can be configured to train a representative 3D shape model of a human body. In a non-limiting example, a 3D shape model can include a plurality of 3D shape parameters that can be directly generated or extrapolated from multiple 2D images or videos. Examples of 3D shape parameters can include height, weight, chest circumferential measurement, dimensions, body composition, etc., or additional parameters associates with a human body shape. In a non-limiting example, the 3D shape parameters can include 15 parameters. Other suitable number of parameters can also be possible, including skin color, pupil and eye measurements and color, posture, gait information, breathing rate, pulse rate, other vital signs, and the like.

In some examples, the systems can be configured to train a 2D joint model of a human body from user images or videos, e.g., those captured from the image or video capture system 104. The 2-D joint model can include multiple joints of a human body in 2D domain and can be used for training the machine learning models. For example, the systems can use the information from the 2D joint model to obtain the 3D body shape model of the human body. The systems can also use other information, such as user's age, weight, gender, ethnic group, etc., which can be entered by the user via the user interaction and display system (e.g., 102, 302 in FIGS. 1 and 3). In some examples, a joint model can include a plurality of parameters representing skeletal joint positions. As such, training the 2D joint model includes training the parameters of the 2D joint model, as is taught in U.S. Pat. No. 9,949,697, the disclosure of which is incorporated herein by reference for all that it contains.

In some examples, the systems can receive captured user images or videos (e.g., from the image or video capture system 104 in FIG. 1) and use the received images or videos to estimate the body joints (in 2D domain) via a machine learning network. The systems can obtain a contour of the human body from the trained 2D joint model by connecting the joints in the 2D joint model, followed by an image or video dilation. The contour defines the exterior boundary of the user's 2D representation.

Returning to FIGS. 1 and 3, the systems can be configured to train user body heatmap thresholds. A user body heatmap can include a visual representation of body scan parameters. For example, a user body heatmap can include representation of body fat and/or bone mineral density of a human body.

In some examples, the body heatmap can be produced based on the body scan parameters in a body scan database. The systems can produce the heatmap and display the body scan parameters (e.g., body fat, bone mineral density) in one or more colors depending on the thresholds. In some examples, the systems can train a machine learning model to learn the heatmap thresholds and use the trained machine learning model to predict a future human body heatmap from captured user images or videos. In some examples, the training of the heatmap thresholds can be performed on an individual basis, which allows the system to be able to monitor/estimate an individual's body parameters over time.

Examples of the machine learning models used in the systems and processes described in FIGS. 1-4 can include U-net, V-net, or other machine learning models. Additionally and/or alternatively, the machine learning model can also include a suitable convolution neural network (CNN), such as VGG-16 or other CNNs. In some examples, the machine learning models can be learned from user images or videos and the medical images or videos together via co-registration of these two types of images or videos.

Figure 5:
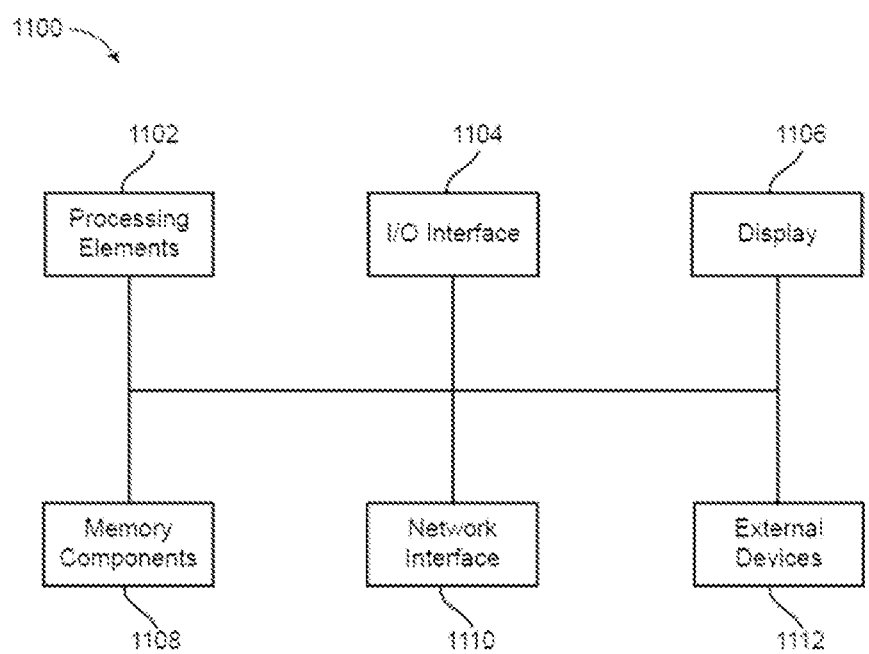
FIG. 5 is a block diagram of a computing device that can be used to implement with the various systems or integrated into one or more components of the systems according to some examples described in the disclosure.

FIG. 5 shows a simplified block structure for a computing device that can be used with the system 100 (in FIG. 1) or integrated into one or more components of the system. For example, the image or video capture system 104, 304, the user interaction and display system 102, 302, the biomarker extraction systems 106, 108, the feature extraction system 308, and/or other components in the systems 100, 300 (FIGS. 1 and 3) can include one or more of the components shown in FIG. 5 and be used to implement one or more blocks or execute one or more of the components or operations disclosed in FIGS. 1-4. In FIG. 5, the computing device 1100 can include one or more processing elements 1102, an input/output interface 1104, a display 1106, one or more memory components 1108, a network interface 1110, and one or more external devices 1112. Each of the various components can be in communication with one another through one or more busses, wireless means, or the like.

The processing element 1102 can be any type of electronic device capable of processing, receiving, and/or transmitting instructions. For example, the processing element 1102 can be a central processing unit, microprocessor, processor, or microcontroller. Additionally, it should be noted that some components of the computer 1100 can be controlled by a first processor and other components can be controlled by a second processor, where the first and second processors can or may not be in communication with each other.

The memory components 1108 are used by the computer 1100 to store instructions for the processing element 1102, as well as store data, such as the machine learning models and/or training images or videos or training data, and the like. The memory components 1108 can be, for example, magneto-optical storage, read-only memory, random access memory, erasable programmable memory, flash memory, or a combination of one or more types of memory components.

The display 1106 provides audio and/or visual guidance to a user, such as displaying skeletons or other visual representations to guide the user in capturing one or more user images or videos, or display other visual representation as can be implemented in the user interaction and display system 102, 302 (FIGS. 1 and 3). Optionally, the display 1106 can act as an input element to enable a user to control, manipulate, and calibrate various components of the computing device 1100. The display 1106 can be a liquid crystal display, plasma display, organic light-emitting diode display, and/or other suitable display. In embodiments where the display 1106 is used as an input, the display can include one or more touch or input sensors, such as capacitive touch sensors, resistive grid, or the like.

The I/O interface 1104 allows a user to enter data into the computer 1100, as well as provides an input/output for the computer 1100 to communicate with other devices or services. The I/O interface 1104 can include one or more input buttons, touch pads, and so on.

The network interface 1110 provides communication to and from the computer 1100 to other devices. For example, the network interface 1110 allows the systems 100 (FIG. 1) to communicate with various components in the system through a communication network. The network interface 1110 includes one or more communication protocols, such as, but not limited to Wi-Fi, Ethernet, Bluetooth, and so on. The network interface 1110 can also include one or more hardwired components, such as a Universal Serial Bus (USB) cable, or the like. The configuration of the network interface 1110 depends on the types of communication desired and can be modified to communicate via Wi-Fi, Bluetooth, and so on.

The external devices 1112 are one or more devices that can be used to provide various inputs to the computing device 1100, e.g., mouse, microphone, keyboard, trackpad, or the like. The external devices 1112 can be local or remote and can vary as desired. In some examples, the external devices 1112 can also include one or more additional sensors that can be used in obtaining health or disease risk assessment.

The foregoing description has a broad application. For example, while examples disclosed herein can focus on central communication system, it should be appreciated that the concepts disclosed herein can equally apply to other systems, such as a distributed, central or decentralized system, or a cloud system. For example, the machine learning model (e.g., 110 in FIG. 1, 310 in FIG. 3), or other components can be residing on a server in a client/server system. The machine learning model can also reside on any device, e.g., a mobile phone, on the network and operate in a decentralized manner. The machine learning model, or a portion thereof can also be residing in a controller virtual machine (VM) or a hypervisor in a VM computing environment. Accordingly, the one or more components in the system 100, 300 (FIGS. 1 and 3) can be implemented in various configurations to achieve an optimal performance in terms of accuracy and processing speed. Thus, the disclosure is meant only to provide examples of various systems and methods and is not intended to suggest that the scope of the disclosure, including the claims, is limited to these examples.

The various embodiments described in FIGS. 1-5 provide advantages in assessing a user's health or disease risks based on user images or videos captured from a mobile phone or other image or video capture devices, without requiring any expensive equipment at prescribed locations. The training and using of various machine learning models in the assessment systems provide advantages in achieving high accuracy. Additionally, once the health or disease risks are determined, recommended actions can be determined by the system, and recommended to the user, including exercises, dietary changes, sleep or rest recommendations, and/or medical and pharmaceutical treatments.

From the foregoing it will be appreciated that, although specific embodiments of the disclosure have been described herein for purposes of illustration, various modifications can be made without deviating from the spirit and scope of the disclosure. Accordingly, the scope of the disclosure should not be limited any of the specific embodiments described herein.

Each of the embodiments, examples, or configurations described in the detailed description above may include any of the features, options, and possibilities set out in the present disclosure, including those under the other independent examples, and may also include any combination of any of the features, options, and possibilities set out in the present disclosure and figures.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

From the foregoing it will be appreciated that, although specific embodiments of the disclosure have been described herein for purposes of illustration, various modifications may be made without deviating from the spirit and scope of the disclosure. Accordingly, the scope of the disclosure should not be limited any of the specific embodiments described herein.

What is claimed is:

1. A method of predicting health or disease risk, comprising:
    capturing an image of a user with an image capturing system integrated into a dual use electronic device;
    estimating body dimensions and body composition of the user from the captured image;
    capturing a vital sign of the user via the camera; and
    analyzing the estimated body dimension, composition, and the captured vital sign to detect a health indicator or a disease indicator.

2. The method of claim 1, wherein a machine learning network is used to detect the health or disease indicator.

3. The method of claim 1, wherein the image capturing system includes a camera configured to capture the image of the user while the user is interacting with the dual use electronic device.

4. The method of claim 3, wherein capturing the image includes capturing multiple images in video format.

5. The method of claim 1, wherein the dual use electronic device includes a display system having a display screen.

6. The method of claim 1, further comprising recommending a lifestyle change based on the detected health or disease indicator.

7. The method of claim 1, wherein the dual use electronic device includes a reflective portion that displays a reflected image of the user.

8. The method of claim 1, wherein the health or disease indicator includes a heart health indicator, a body composition, a body dimension, and a vital sign.

9. The method of claim 1, wherein the health or disease indicator includes a stroke indicator.

10. The method of claim 1, wherein the health or disease indicator includes an orthopedic abnormality indicator, a chronic disease indicator, a chronic disease risk parameter, or a comorbidity indicator.

11. An apparatus comprising:
   a camera;
   a processor; and
      a computer readable medium containing programming instructions that, when executed, will cause the processor to:
      analyze an image captured by the camera;
      estimate a user body dimensions and composition from the captured image;
      capture a vital sign of the user via the camera; and
      use a machine learning model and to analyze the estimated body dimension, composition, and vital sign to detect a health or disease indicator.

12. The apparatus of claim 11, wherein the programming instructions, when executed, will further cause the processor to predict a health or disease based on the detected health or disease indicator.

13. The apparatus of claim 11, further comprising a display portion.

14. The apparatus of claim 13, wherein the display portion comprises a reflective portion.

15. The apparatus of claim 11, further comprising one of an exercise device, an appliance, a home entertainment device, or an automobile.

16. The apparatus of claim 11, wherein the health or disease indicator includes a stroke indicator or a heart health indicator or a disease indicator.

17. A method of detecting health or disease indicators, comprising:
   providing a device, the device comprising:
      an image capturing system; and
      a processor;
   capturing an image of a user with the image capturing system of the device; and
   executing programming instructions contained on computer readable medium to cause the processor to:
   estimate body dimensions and body composition of the user from the captured image;
   capture a vital sign of the user via the camera; and
   analyze the estimated body dimension, composition, and the captured vital sign to detect a health indicator or a disease indicator.

18. The method of claim 17, wherein capturing the image includes capturing multiple images in video format.

19. The method of claim 17, wherein the device further comprises a display portion.

20. The method of claim 17, wherein the device comprises one of an exercise device, an appliance, a home entertainment device, or an automobile.

* * * * *